(12) United States Patent
Chomay

(10) Patent No.: US 6,634,185 B2
(45) Date of Patent: Oct. 21, 2003

(54) METHOD OF TREATING A ROCK CHIP IN A VEHICULAR WINDSHIELD

(76) Inventor: Edward John Chomay, P.O. Box 189, Newbrook, Alberta (CA), T0A 2P0

( * ) Notice: Subject to any disclaimer, the term of this patent is extended or adjusted under 35 U.S.C. 154(b) by 57 days.

(21) Appl. No.: 09/821,000

(22) Filed: Mar. 29, 2001

(65) Prior Publication Data

US 2002/0023704 A1 Feb. 28, 2002

(30) Foreign Application Priority Data

Mar. 31, 2000  (CA) ............................................. 2304290

(51) Int. Cl.[7] ................................................ B32B 35/00
(52) U.S. Cl. ................. 65/28; 156/94; 156/98; 156/268; 264/36.18; 264/36.21; 264/36.22
(58) Field of Search ............................ 156/94, 98, 268; 264/36.1, 36.18, 36.21, 36.22; 425/11, 12, 13; 65/28, 174, DIG. 3; 83/875, 879; 29/402.01

(56) References Cited

U.S. PATENT DOCUMENTS 4,208,229 A * 6/1980 Giardini ...................... 125/20
5,565,217 A   10/1996 Beckert et al. ................ 425/12

\* cited by examiner

Primary Examiner—Michael W. Ball
Assistant Examiner—Gladys Corcoran
(74) Attorney, Agent, or Firm—Davis & Bujold, P.L.L.C.

(57) ABSTRACT

A method of treating a rock chip in a vehicular windshield consists of the step of inscribing in the glass of the vehicular windshield a circular crack barrier that surrounds the rock chip. Any cracks emanating from the rock chip tend to remain confined within the circular crack barrier.

5 Claims, 3 Drawing Sheets

METHOD OF TREATING A ROCK CHIP IN A VEHICULAR WINDSHIELD

FIELD OF THE INVENTION

The present invention relates to a method of treating a rock chip in glass in a vehicular windshield.

BACKGROUND OF THE INVENTION

A rock chip in a vehicular windshield has a tendency to serve as a source for cracks if not promptly treated. These cracks extend across the windshield, adversely affecting the structural integrity of the windshield and obscuring vision of a driver through the windshield.

The current method of treatment involves the application of a transparent filler. An example of such a method of treatment is described in U.S. Pat. No. 5,565,217 which was issued to TCG International Inc. in 1996. Unfortunately, the results of this mode of treatment are not predictable; sometimes the treatment works and sometimes it doesn't.

SUMMARY OF THE INVENTION

What is required is a more effective method of treating a rock chip in a vehicular windshield.

According to the present invention there is provided a method of treating a rock chip in a vehicular windshield. The method consists of the step of inscribing in the glass of the vehicular windshield a circular crack barrier that surrounds the rock chip. Any cracks emanating from the rock chip tend to remain confined within the circular crack barrier.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

The preferred method of treating a rock chip in a vehicular windshield will now be described with reference to FIGS. 1 through 4.

Figure 1:
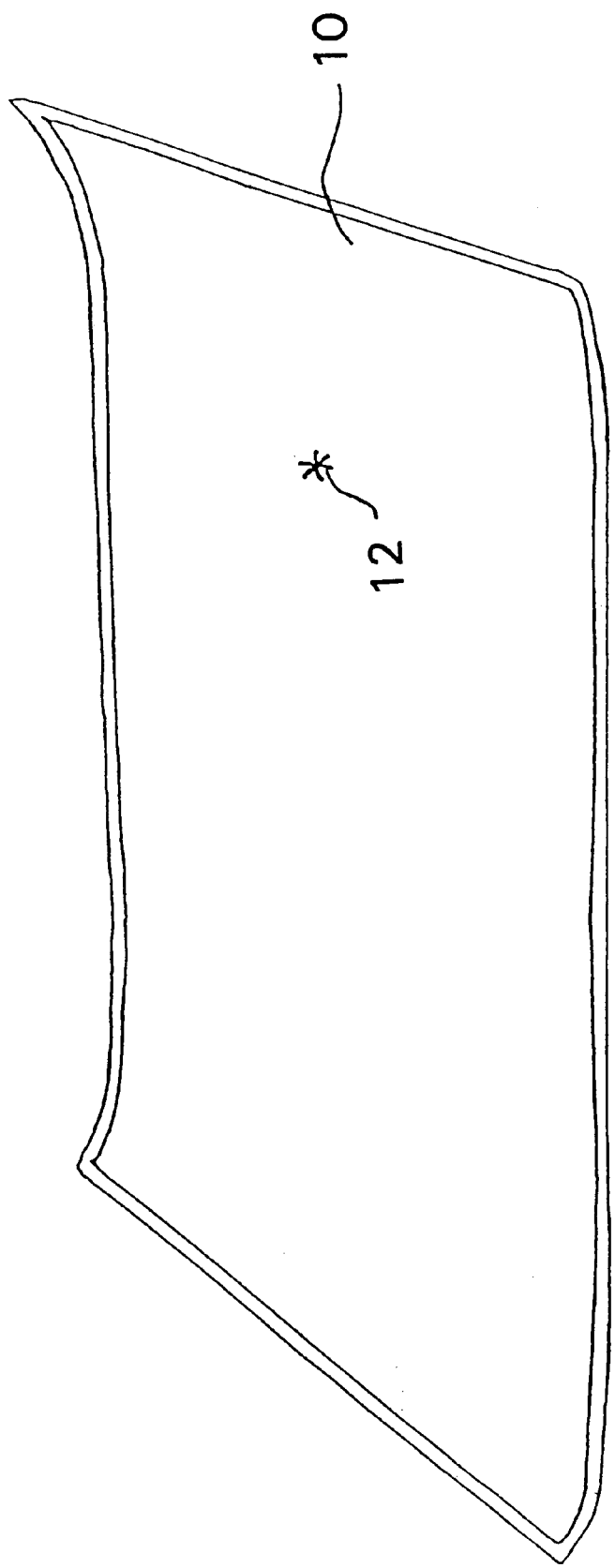
FIG. 1 labelled as PRIOR ART is a perspective view of a glass windshield having a rock chip.
Figure 4:
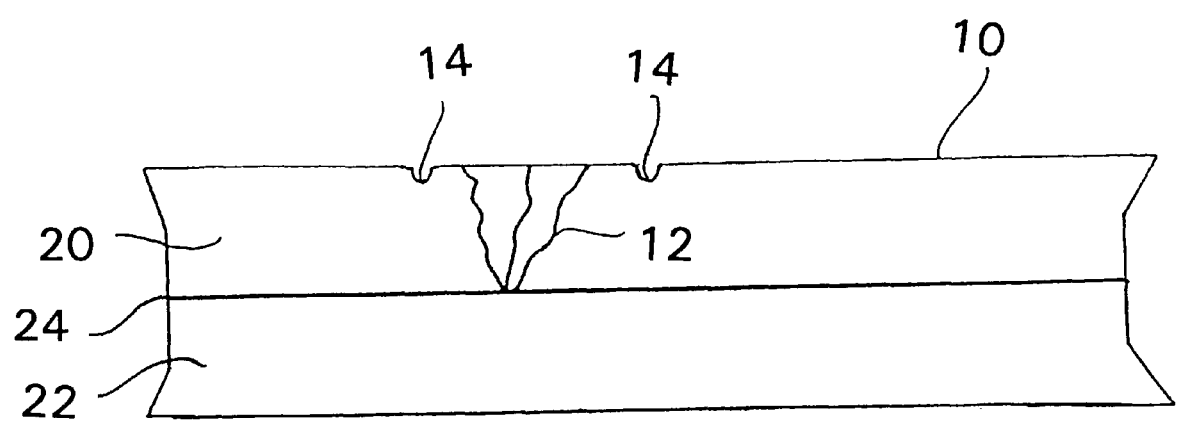
FIG. 4 is a detailed side view, in section, of the glass windshield having a rock chip illustrated in FIG. 2.

Referring to FIG. 1, a vehicular windshield 10 with a rock chip 12 is illustrated. Referring to FIG. 4, vehicular windshield 10 is made from safety glass having an outer glass layer 20 and an inner glass layer 22. A plastic membrane 24 is interposed between outer glass layer 20 and inner glass layer 22. Plastic membrane 24 prevents rock chip 12 from spreading from outer glass layer 20 to inner glass layer 22.

Figure 2:
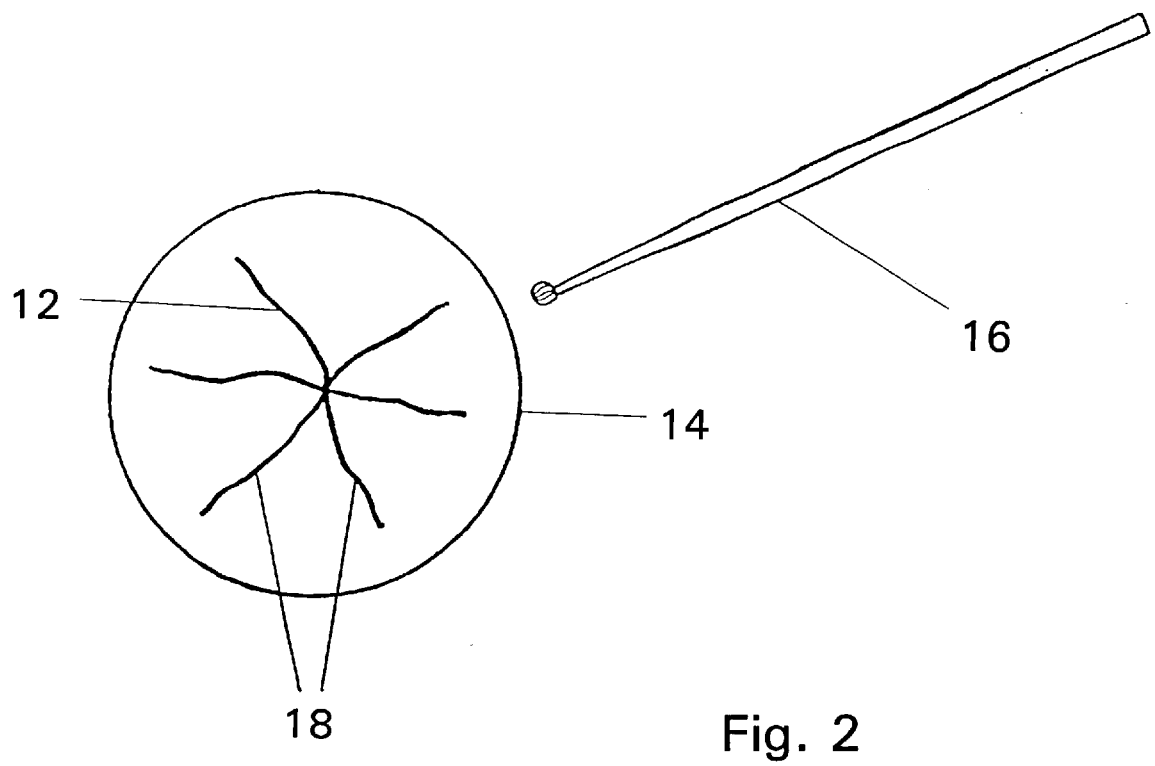
FIG. 2 is a detailed perspective view of the glass windshield having a rock chip illustrated in FIG. 1, being treated in accordance with the teachings of the present method of treating a rock chip in glass.

Referring to FIG. 2, the method of treating rock chip 12 in vehicular windshield 10 consists of the step of inscribing in outer glass layer 20 of vehicular windshield 10 a circular crack barrier 14 in the form of an annular groove that surrounds rock chip 12. In the illustrated embodiment, an engraving tool 16 is used to inscribe circular crack barrier 14. Referring to FIG. 4, circular crack barrier 14 is inscribed onto outer glass layer 20 of vehicular windshield 10.

Figure 3:
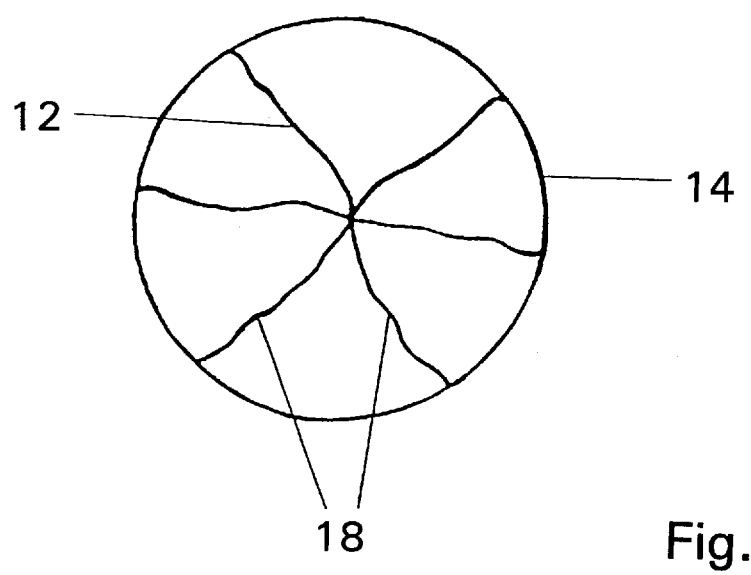
FIG. 3 is a detailed perspective view of the glass windshield having a rock chip illustrated in FIG. 2, showing how cracks emanating from the rock chip are confined after treatment.

Any cracks 18 emanating from rock chip 12 tend to remain confined within circular crack barrier 14 as shown in FIG. 3. The depth of circular crack barrier 14 may vary with the depth of rock chip 12. Beneficial results have been obtained using a depth of 0.001 of an inch. This depth has been found to be suitable for most rock chips.

The above described method can be used in conjunction with transparent filler treatments. The present method will confine any cracks 18 emanating from rock chip 12. The transparent filler will conceal cracks 18 and rock chip 12 to preserve the aesthetic appearance of vehicular windshield 10.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. A method of treating a rock chip in a vehicular windshield, comprising the step of:
    inscribing in a glass layer of the vehicular windshield a circular crack barrier in the form of an annular groove that surrounds the rock chip, wherein any cracks emanating from the rock chip remain confined within the circular crack barrier.

2. A method for repairing a rock chip in a vehicular windshield, the method comprising the steps of:
    providing a vehicular windshield having a rock chip formed therein;
    confining the rock chip in the windshield by inscribing an annular groove in an outer surface of the vehicular windshield completely encompassing the rock chip; and
    forming the annular groove to a desired depth in the outer surface of the windshield to ensure the rock chip does not spread beyond the inscribed annular groove.

3. The method for repairing a rock chip in a vehicular windshield according to claim 2, further comprising the step of filling the rock chip with a transparent filling material.

4. The method for repairing a rock chip in a vehicular windshield according to claim 2, the method further comprising the step of forming the annular groove to the desired depth of about 0.001 inch.

5. A method for repairing a rock chip in a vehicular windshield, the method comprising the steps of:
    providing a vehicular windshield having an inner glass layer, an outer glass layer and a plastic membrane interposed between the inner and outer glass layer, the outer glass layer having a rock chip formed therein;
    confining the rock chip in the outer glass layer by inscribing an annular groove to a depth of about 0.001 inch in a surface of the outer glass layer of the vehicular windshield around the rock chip;
    completely encompassing the rock chip within the annular groove, and
    filling the rock chip with a transparent filling material.

\* \* \* \* \*